April 21, 1936.  W. A. REICHEL ET AL  2,038,059
INSTRUMENT FOR TRANSMITTING ANGULAR MOVEMENT
Filed Jan. 17, 1935  3 Sheets-Sheet 1
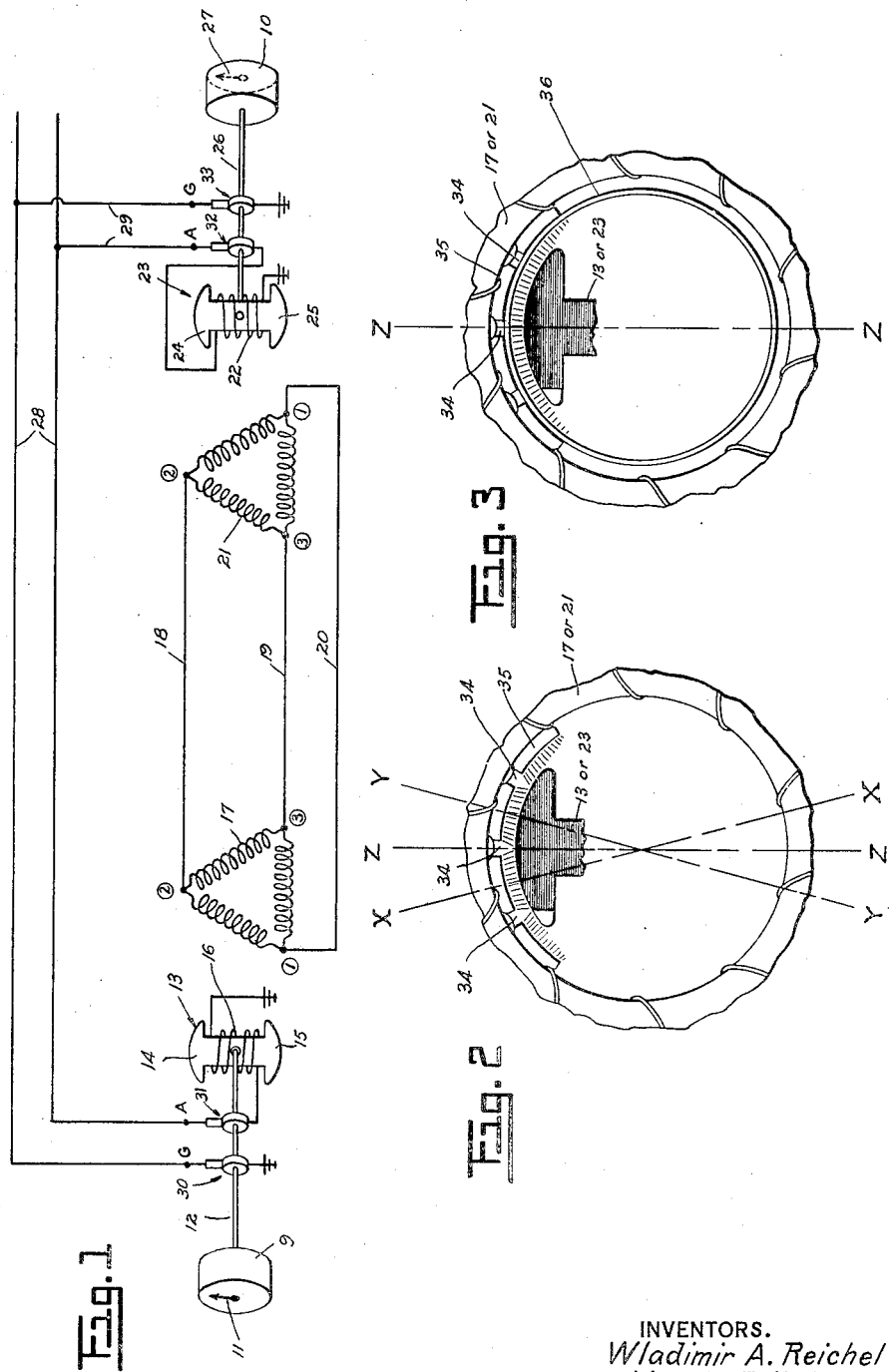
INVENTORS.
Wladimir A. Reichel
Morris F. Ketay
BY Stephen Cerstvik
ATTORNEY.

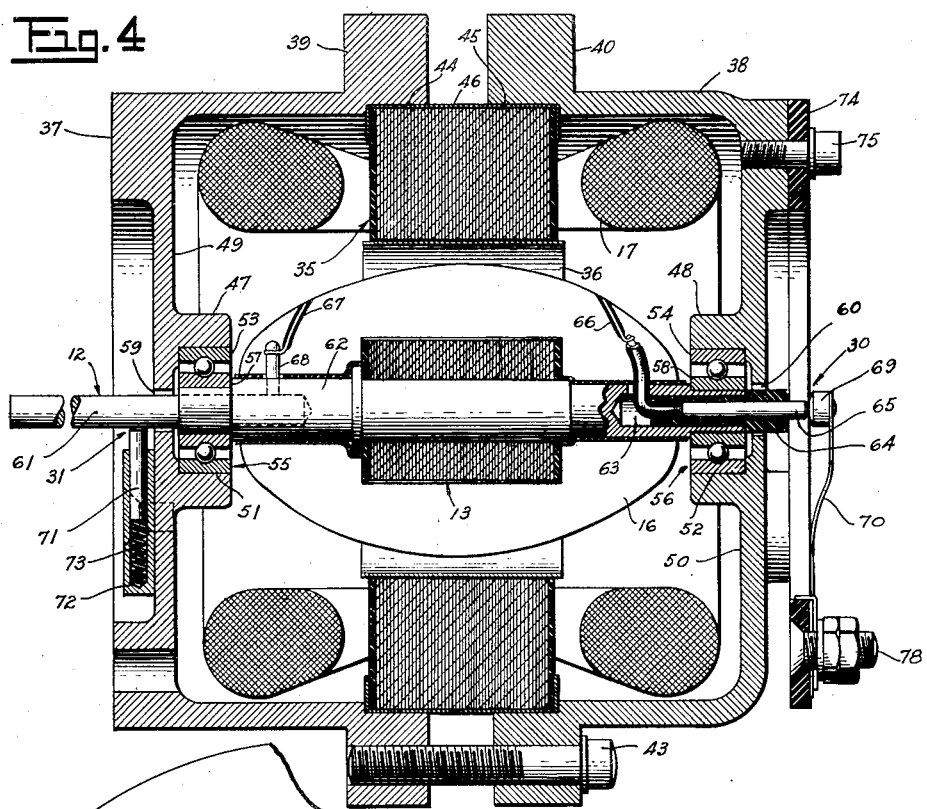

April 21, 1936.   W. A. REICHEL ET AL   2,038,059
INSTRUMENT FOR TRANSMITTING ANGULAR MOVEMENT
Filed Jan. 17, 1935   3 Sheets-Sheet 3
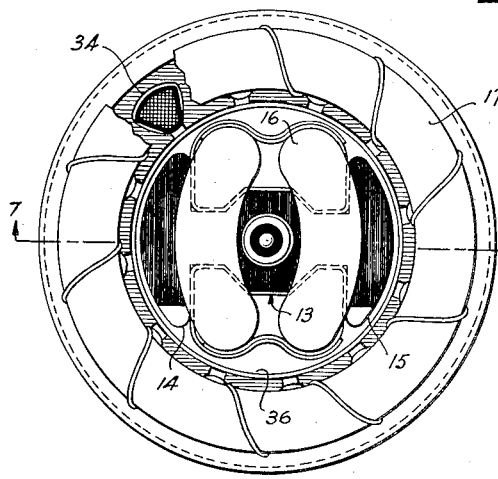
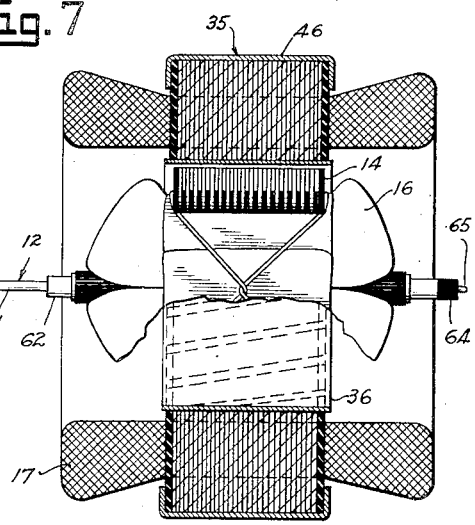
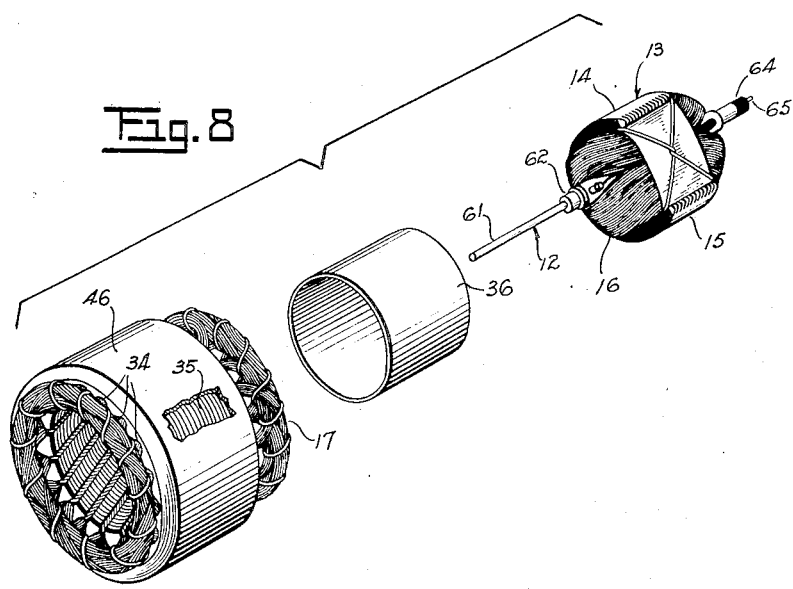
INVENTORS.
Wladimir A. Reichel
Morris F. Ketay
BY Stephen Cerstvik
ATTORNEY.

Patented Apr. 21, 1936

2,038,059

UNITED STATES PATENT OFFICE 2,038,059

INSTRUMENT FOR TRANSMITTING ANGULAR MOVEMENT

Wladimir A. Reichel, Philadelphia, Pa., and Morris F. Ketay, Brooklyn, N. Y., assignors to Bendix Aviation Corporation, South Bend, Ind., a corporation of Delaware Application January 17, 1935, Serial No. 2,292

8 Claims. (Cl. 172—239)

This invention relates to electrical instruments for transmitting angular movements.

One of the objects of the invention is to provide a novel mechanical structure in self-synchronous electrical instruments for the transmission of angular movements to a remote point whereby the accuracy of such instruments is greatly increased and their structures substantially simplified and whereby the instruments may be made relatively small without detracting from their efficiency.

Instruments of the above type comprise a polyphase armature winding with a single-phase field winding in inductive relation therewith, the two windings being relatively rotatable. In the application of such instruments to the transmission of the angular movement of an object such, for example, as an indicator, one of the instruments, called a generator, may be operatively connected to the object for rotation thereby in accordance with the angular movement thereof. Another instrument called a motor has its armature winding electrically connected to the armature winding of the first instrument or generator. The fields of the instruments are energized from a suitable source of alternating current and, consequently, voltages are induced in their respective armature windings. These voltages normally counterbalance but upon movement of the object, the generator windings are relatively displaced which causes the voltages to become unbalanced. The result is a flow of equalizing currents in the mutually connected armature windings of the instruments, which currents exert a torque upon the rotatable element of the motor causing it to reproduce the movement imparted to the generator by the object.

Heretofore, instruments of the above type had to be made necessarily large in order to provide a certain degree of accuracy in the indications produced by the motor instrument. In view of their relatively large size such instruments, particularly when used as generators, could not be readily employed for transmitting to a remote point the indications of sensitive devices such as barometric pressure responsive devices or altimeters, temperature responsive devices, fuel level gauges, manifold pressure gauges and other sensitive indicating instruments such as are generally employed on aircraft, because the power available in such sensitive indicating devices is insufficient to operate the relatively large generator instrument. Accordingly, another object of the invention is to provide a novel structure in electrical instruments for transmitting angular movements whereby the dimensions of the instrument, for a given torque and accuracy, may be materially reduced and yet be sufficiently sensitive to be capable of operation by delicate devices the angular movements of which are to be transmitted to a remote point.

The invention is particularly applicable to self-synchronous instruments of the type in which the stator winding is a distributed winding wound on a hollow cylindrical laminated core having circumferentially spaced slots along its length on the inside thereof, and the rotor winding is a lumped single-phase winding wound on a core providing salient poles cooperating with the cylindrical core of the distributed stator winding. With structures of this type, when used to repeat indications of an indicating device, it was not possible heretofore to obtain a very high degree of accuracy because of unequal distribution of flux between the cylindrical core of the stator winding and the salient pole pieces of the core of the rotor winding due to the presence of the air gaps formed by the longitudinal slots of the stator core in which the stator winding is wound, and it was found that the indications produced at the remote point by the rotor of the receiving instruments did not coincide closely with the indications or angular movements of the object or indicator which operates the rotor of the transmitting instrument. It was further found that the number of points at which the inaccuracies occurred in one revolution of the rotor corresponded to the number of slots in the core of the stator. The reason for these inaccuracies is that when the salient poles of the rotor fall into a position in which a central plane passing radially through the poles is in alignment with a slot for a required angular movement, the pole pieces of the rotor will not remain in this position but will align themselves radially into a position in which the central plane is on either side of the slot or air gap depending on which side the flux is greater. Thus, the rotor would come to rest several degrees out of the angular position in which it is supposed to be for a given angular movement. It is, therefore, another object of the present invention to provide a novel structure wherein the foregoing difficulties are eliminated by the provision of means for equalizing the distribution of the flux between the core of the distributed winding and the salient pole pieces of the lumped winding irrespective of whether the distributed winding be a rotor or a stator inasmuch as it may be possible to provide a stator having a lumped winding wound on a core providing salient pole pieces, and a rotor having a distributed winding wound on a cylindrical core having longitudinal air gaps formed by slots in which the winding is wound.

A further object is to provide a novel structure in an electrical instrument of the class described, whether it be used as a generator or as a motor unit, comprising a two-part cylindrical casing, each part being constituted by a cup-shaped member having a peripheral flange at the open end and provided with an annular recess in the inner wall at said open end for receiving the cylindrical core of a stator, said core being relatively shorter than the inner depth of the two cup-shaped members so that when the latter are placed together with their flanges opposite each other, the stator is held in position by said cup-shaped members in the annular recess thereof, and the winding of said stator, if distributed, projects into the interior of the cup-shaped members beyond the recesses, said cup-shaped members being also provided with receses on the inside of the rear walls thereof and disposed opposite each other when the members are placed together for snugly receiving the outer races of ball bearings, and with openings concentric with the recesses for receiving a rotor shaft carrying a rotor winding wound on a core, preferably laminated, rigidly secured to said shaft, said shaft having a contact pin disposed axially therewith in one end thereof but insulated therefrom and adapted to project through the opening in one of the cup-shaped members, the other end of said shaft being adapted to project through the opening in the other cup-shaped member, said winding being directly connected to the latter end of the shaft and to the pin at the other end of said shaft, a ball bearing disposed on either side of the rotor and each bearing having its inner race carried by said shaft, said ball bearings being so spaced on said shaft that when the rotor is placed into the two cup-shaped members in cooperative relation with the stator, the outer races of the bearings fall exactly into and fit snugly in the inner recess of the bosses of said members, a pin carried by one of the cup-shaped members and disposed adjacent the fixed opening in said member at right angles to the shaft when the latter is inserted in said opening, a spring urging said pin against said shaft to provide firm electrical contact therebetween said shaft and pin constituting a ground connection to the cup-shaped member for the rotor winding an insulated plate or collar secured on the outer end of the other cup-shaped member concentrically therewith, a plurality of terminals carried by said plate, one of said terminals having a spring arm carrying a contact which bears against the axial pin of the shaft to provide an electrical contact to the other end of the rotor winding, the other terminals providing connections to the stator winding and to a source of alternating current, and means for securing the two cup-shaped members at the flanges. This arrangement thus forms an assembled structure in which only four elements are required to be removed for replacement or inspection, and provides for ease of assembly in manufacture, said four removable elements being the two cup-shaped members, the stator and the rotor.

A still further object is to provide a self-synchronous instrument of the type having a rotor member and a stator member, one of which is provided with a distributed winding wound in longitudinal slots formed in a cylindrical core and the other of which has a lumped winding wound on a core having salient pole pieces, novel means comprising a hollow cylindrical shell of magnetic material carried by and concentrically with the member having the slotted core for closing said slots to eliminate the air gaps formed by the slots whereby the magnetic flux between the cores of the rotor and stator members is evenly distributed so that the rotor member will maintain its angular position for a given angular movement imparted thereto irrespective of whether or not that position is such that a central radial plane passing through the pole pieces of the one member is in radial alignment with a pair of diametrically opposed slots of the other member.

Another object of the invention is to provide in a self-synchronous instrument for transmitting angular movements and including a stator having a three-phase winding, and a rotor having a single-phase winding, novel means for passing current into and out of said single-phase rotor winding through the ends of the shaft of the rotor whereby slip rings are rendered unnecessary.

Still another object of the invention is to provide a novel structure in an electrical instrument of the class described whereby the number of structural parts is greatly reduced and, hence, the entire structure substantially simplified so that the instrument may be readily manufactured in large quantities and assembled easily.

The invention consists substantially in the construction, combination, location and relative arrangement of parts for obtaining the results desired in accordance with the foregoing objects, as will be more fully hereinafter set forth in the specification, as shown in the accompanying drawings by way of example, and as finally pointed out in the appended claims.

Other objects and advantages of the invention will appear more fully hereinafter from a consideration of the detailed description which follows, taken together with the accompanying drawings wherein one embodiment of the invention is illustrated. It is to be expressly understood, however, that the drawings are for purposes of illustration and description only and are not designed as a definition of the limits of the invention, reference being had for this purpose to the claims.

In the drawings wherein like reference characters refer to like parts throughout the several views:

Fig. 1 is a schematic arrangement representing a motion-transmitting system embodying electrical instruments to which the present invention has been applied;

Fig. 2 is a cross sectional view, with parts broken away, of a rotor and stator of a self-synchronous instrument of the prior art showing the unequal distribution of flux in the stator winding;

Fig. 3 is a view similar to Fig. 2 showing the manner in which the flux is equally distributed in accordance with the present invention;

Fig. 4 is an enlarged longitudinal section of one practical form of self-synchronous electrical instrument embodying the novel structure of the present invention, which structure is applicable to either a motor or generator instrument;

Fig. 5 is an end view of the instrument shown in Fig. 4, with parts broken away, as viewed from the right of the latter figure;

Fig. 6 is another end view, with parts broken away, of the stator and rotor assembly removed from the casing as viewed from the right of Fig. 4;

Fig. 7 is a longitudinal section of the stator and rotor assembly shown in Fig. 6, and Fig. 8 is an exploded view of the stator and rotor assembly shown in Figs. 6 and 7, and in approximately actual size.

Referring now to the drawings and first to Fig. 1, there is shown diagrammatically a transmission system embodying two electrical instruments of the present invention and 9 represents an indicating device such, for example, as a fuel gauge or an altimeter, the indications of which are to be transmitted to and reproduced at a remote point, the indicator at the remote point being shown at 10. The indicating device 9 is shown as having a pointer 11 which is adapted to rotate the shaft 12 through any suitable mechanism (not shown) or by a direct connection. The shaft 12 has secured thereto a soft iron core 13, preferably laminated, provided with two salient pole pieces 14 and 15 and on which is wound, in the present instance, a lumped winding 16. In inductive relation with the rotor winding 16 is a three-phase stator winding 17 which, in this case, is a distributed winding wound in slots formed on the inside of a hollow cylindrical core within which the core 13 is adapted to rotate, as will appear more fully hereinafter.

The three-phase stator winding 17 is connected by means of leads 18, 19 and 20 to a similar three-phase stator winding 21 located at the remote point to which the angular movements of the pointer 11 are to be transmitted and at which they are to be indicated by the indicator 10. The three-phase stator winding 21, like the winding 17, is, in the present instance, a distributed winding wound in slots formed on the inside of a cylindrical soft iron core. In inductive relation with the three-phase winding 21 and rotatable with respect thereto is a single-phase winding 22 which, like winding 16, is a lumped winding wound on a core 23 provided with salient pole pieces 24 and 25, said core 23 being positioned within the core of winding 21 and with its winding 22 constituting the rotor of the receiving instrument or motor. The core 23 is carried by and rigidly secured to a shaft 26 which is adapted to rotate a pointer 27 of the indicator 10.

The windings 16 and 22 may be called the rotating fields of the transmitting generator instrument and the receiving motor instrument, respectively, while the windings 17 and 21 may be called the stationary armatures of said instruments. These field windings 16 and 22 are arranged to be energized from a suitable source of alternating current (not shown) by means of leads 28 and 29, respectively, through suitable sliding contacts 30, 31 and 32, 33, respectively, the contacts 30 and 33 and one end of the windings 16 and 22 being grounded for structural reasons as will appear more fully hereinafter.

By virtue of the alternating currents flowing in the field windings 16 and 22 there are voltages induced in their respective armature windings 17 and 21. These voltages normally counterbalance but upon angular movement of the winding 16 and its core by the device 9 through the shaft 12, these voltages become unbalanced with the result that equalizing currents are caused to flow in their mutually connected armature windings 17 and 21, thereby exerting a torque on the field winding 22 and its core 23, thus causing them to rotate the pointer 27 of the device 10 through the shaft 26 and, hence, to reproduce the movement imparted to the winding 16 and its core 14 by the device 9.

Due to the fact, however, that the windings 17 and 21 are distributed windings wound in slots formed on their cores, there is an uneven distribution of the flux between their cores and the cores of the rotor windings 16 and 22, as will be seen by reference to Fig. 2 wherein are shown the slots 34 of the stator core 35 and in which the winding 17 or the winding 21 is wound. This unequal distribution of flux, as previously pointed out, causes inaccurate indications to be reproduced at the remote point and means are, therefore, provided for eliminating these inaccuracies by providing an equal distribution of the flux between the cores of the stator and rotor windings. In the form shown in Fig. 3, said means are constituted by a cylindrical shell 36 of suitable magnetic material and having substantially the same length as the stator core 35 and held within said cylindrical stator core 35 in any suitable manner so as to close each of the slots 34, thus distributing the flux in the manner shown in said Fig. 3. By virtue of this equal flux distribution, the rotor of the receiving motor instrument is made to assume the angular position of the rotor of the transmitting generator instrument to an accuracy of from one-half to one degree, thus providing for extreme accuracy of indications of the indicator 10. This will be readily apparent from Figs. 2 and 3. In Fig. 2, the pole pieces will fall into a position in which a central radial plane passing through the rotor will be either in position X—X or Y—Y and will not assume a position in which the plane would be in alignment with an air gap as in position Z—Z, for example. On the other hand, when the flux is evenly distributed as shown in Fig. 3, the pole pieces may assume a position in which the central radial plane will be in alignment with an air gap if the movement of the transmitting rotor is required to be in this position for an indication. Or, if a desired position of the rotor is such that the central radial plane thereof should be somewhere between positions X—X and Z—Z or between Y—Y and Z—Z, the pole pieces will not take this position in Fig. 2 but will go either to X—X or Y—Y depending on whether the pull is greater in the direction of X—X or Y—Y, there being no magnetic pull at Z—Z because of the air gap 34. In Fig. 3, however, since the flux is evenly distributed and there are no bare spots in the flux, the rotor will come within one-half of one degree of the desired position regardless of whether the desired position is at one of the air gaps 34 or slightly to the left or to the right thereof.

Referring to Figs. 4 to 8, inclusive, there is shown one practical form of self-synchronous electrical instrument embodying the novel structure of the present invention, which structure is applicable to either a motor or generator instrument and comprises a two-part casing constituted by a pair of cup-shaped members 37 and 38 provided at their open ends with flanges 39 and 40, respectively, for securing said cup-shaped members together by means of a plurality of circumferentially arranged screws, three of which are shown at 41, 42 (Fig. 5) and 43 (Fig. 4). The cup-shaped members 37 and 38 are provided with annular recesses 44 and 45 at their open ends for receiving the cylindrical laminated core 35 of the stator winding 17, the laminations of said core being held together by a retaining shell 46. Thus, when the cup-shaped members 37 and 38 are placed together with their flanges 39 and 40 opposite each other, the laminated stator core 35 is held in position by said cup-shaped members in the annular recesses 44 and 45. As shown in Figs. 4, 6, 7 and 8, the winding 17 is a distributed winding and is wound in the longitudinal slots 34 of the laminated core 35 so that the exterior portions of said winding project into the cup-shaped members 37 and 38. The cup-shaped members 37 and 38 are also provided with bosses 47 and 48, respectively, on their rear walls 49 and 50 and the bosses are formed with annular recesses 51 and 52, respectively, for receiving the outer races 53 and 54 of the ball bearings 55 and 56, the inner races 57 and 58 of said ball bearings being fitted on the rotor shaft 12 which carries the rotor core 13 and rotor winding 16, said shaft being arranged to project through the openings 59 and 60 in the rear walls 49 and 50 of the cup-shaped members 37 and 38, said openings being concentric with the bosses 47 and 48 and the recesses 51 and 52 and the ball bearings 55 and 56 are so spaced apart from each other on the shaft 12 that when the cup-shaped members are placed together the ball bearings fit exactly into the recesses 51 and 52.

Novel means are now provided for passing current into and out of the rotor winding 16 without using slip rings and to this end, as shown in Fig. 4, the rotor shaft 12 is constituted by a portion 61, one end of which fits into a cylindrical opening provided in one end of another portion 62 of said shaft, said portion 62 carrying the laminated rotor core 13 on which the lumped single-phase winding 16 is wound. The other end of the shaft portion 62 is provided with a cylindrical opening 63 in which is inserted a tubular insulating member 64. Within the tubular insulating member 64 there is located a contact pin 65 coaxial with the shaft 12, and one end 66 of the lumped winding 16 is connected to said contact pin 65 as shown in Fig. 4, and the other end 67 of said winding is connected to a transverse pin 68 which projects through the portion 62 of the shaft into the cylindrical opening so as to come into direct contact with the portion 61 of the shaft.

The pin 65 forms a sliding contact with the contact member 69 carried by a spring arm 70 so that said spring arm causes said contact 69 to firmly engage the end of the pin 65. At the other end of the shaft 12 the portion 61 of said shaft forms a sliding contact with a contact pin 71 disposed adjacent the opening 59 at right angles to the shaft 12, said pin 71 being carried by the cup-shaped member 37 by means of the member 72 which is secured to said cup-shaped member in any suitable manner. The member 72 is provided with a bore into which one end of the pin 71 extends and in which is contained a coil spring 73 for forcing the pin 71 into firm contact with the shaft portion 61. The pin 68, the shaft portion 61 and the pin 71 thus form a ground for the end 67 of the winding 16 through the member 72 to the cup-shaped member 37 of the casing of the instrument.

On the exterior of the rear wall 50 of the cup-shaped member 38 there is provided an insulating plate or collar 74 which is secured to said cup-shaped member 38 by a plurality of circumferentially arranged screws, three of which are shown at 75 (Fig. 4) 76 and 77 (Fig. 5), the screw 77 also constituting a ground terminal to which one end of the alternating current source is adapted to be connected and for this purpose said terminal 77 extends through the plate 74 and into the wall 50. The other end of the alternating current source is to be connected to a terminal 78 carried on insulating collar 74 and engaging the spring arm 70. Thus, it will be seen that when the alternating current source is connected to the terminals 77 and 78, current enters the rotor winding 16 through terminal 78, spring arm 70, contact 69, pin 65, then after flowing through the winding, the current comes out through the pin 68, shaft portion 61, pin 71, member 72 and to the cup-shaped member 37 and back to the source by means of ground terminal 77 since the two cup-shaped members 37 and 38 constitute the ground return of the winding 16 which, as previously pointed out, is a single-phase winding. In this manner, the shaft 12 and pins 68 and 71 constitute the novel means of the invention for passing current into and out of the rotor winding 16 without using slip rings.

Three other terminals 79, 80 and 81 are carried by the insulating collar 74 and constitute means for connecting the three phases of the distributed stator winding 17 to a corresponding stator winding of another instrument of this type in the manner shown in Fig. 1.

As hereinbefore indicated, the hollow cylindrical stator core 35 is provided on the inside thereof with the soft iron cylindrical shell 36 for bridging the air gaps formed by the longitudinal slots 34 so as to provide equal distribution of flux between said core and the salient pole pieces 14 and 15 of the core 13, said shell 36 forming a snug fit within said core 35 so that when it is once placed therein it will remain fixed.

The parts of the above-described structure are so constructed that the cylindrical soft iron shell and the core 35 with its winding 17 and lamination-retaining shell 46 constitute an integral unit while the shaft 12, core 13 and rotor winding 16 constitute another integral unit, i. e., the first-mentioned parts comprise the stator and the last-mentioned parts comprise the rotor. The ball bearings 55 and 56 being carried by the shaft 12 are also an integral part of the rotor and, therefore, once the parts are manufactured they are easily assembled, requiring only that the stator element be inserted into the cup-shaped member 38 and the three phases of the winding 17 thereof be connected to the terminals 79, 80 and 81, respectively. The rotor is then inserted into the stator so that one end of its shaft projects through the opening 60 and the pin 64 contacts the contact 69. At the same time, the ball bearing 56 fits snugly into the annular recesses 52 of the boss 48. Then the cup-shaped member 37 is placed opposite the cup-shaped member 38 so that their flanges 39 and 40 are disposed adjacent each other and the stator fits snugly into the recesses 44 of the cup-shaped member 37 and the rotor shaft projects through the opening 59 of said cup-shaped member 37. The two cup-shaped members are then secured together by means of the screws 41, 42 and 43 thus forming a compact unit.

There is thus provided a novel mechanical structure in a self-synchronous electrical instrument for the transmission of angular movements to a remote point whereby the accuracy of the instrument is greatly increased and the structure substantially simplified and whereby the instrument may be made relatively small without detracting from its efficiency. The novel structure also includes means for equalizing the distribution of the flux between the rotor and stator cores whereby the error of the instrument is reduced to about one-half of one degree throughout one revolution of the rotor.

What is claimed is:

1. An instrument for transmitting angular movements, comprising a stator including a hollow laminated cylindrical core member of magnetic material and having a plurality of circumferentially spaced interior grooves along its length forming circumferentially spaced air gaps on the inside surface of said core member, a polyphase distributed winding wound in said grooves, a rotor in inductive relation with said stator, including a core member of magnetic material forming a pair of salient pole pieces and having a lumped single-phase exciting winding thereon, and a hollow cylindrical shell of magnetic material disposed within the stator core member and secured thereto for closing the circumferentially spaced air gaps to smooth out the magnetic path and evenly distribute the magnetic flux between the rotor and stator core members throughout the entire circumference of the stator core member whereby the pole pieces of the rotor core member may assume an angular position within the stator core member at any point throughout the entire circumference of said stator irrespective of whether a central radial plane passing through the pole pieces is radially in line with a groove of said stator core member.

2. An instrument for transmitting angular movements, comprising a stator member and a rotor member in inductive relation therewith, one of said members having a three-phase distributed winding wound on a cylindrical core having a plurality of circumferentially spaced longitudinal grooves forming circumferentially spaced air gaps on the interior surface of said core, and the other of said members having a single-phase lumped winding wound on a core having two salient pole pieces cooperating with the cylindrical core of the other member whereby magnetic flux passes from one member to the other at the pole pieces, and a hollow cylindrical shell secured to the cylindrical core of the member having the distributed winding and concentrically therewith for closing the circumferentially spaced air gaps to smooth out the magnetic path and evenly distribute the flux between the rotor and stator members throughout the entire circumference of the stator member whereby the rotor member may assume an angular position with respect to the stator member at any point throughout one complete revolution of the rotor irrespective of whether the relative positions of the members at that point is such that the center of a pole piece of one member is opposite an air gap on the other member.

3. An instrument for transmitting angular movements, comprising a stator including a hollow laminated cylindrical core member of magnetic material and having a plurality of circumferentially spaced interior grooves along its length forming circumferentially spaced air gaps on the inside of said core member, a polyphase distributed winding wound in said grooves, a shell or sleeve of magnetic material surrounding said stator core member to securely hold the laminations thereof together, a rotor in inductive relation with said stator, including a core member of magnetic material forming a pair of salient pole pieces and having a lumped single phase winding thereon, and a hollow cylindrical shell disposed within the hollow stator core member and secured thereto for closing the circumferentially spaced air gaps to smooth out the magnetic path and evenly distribute the magnetic flux between the rotor and stator core members throughout the entire circumference of the stator member whereby the pole pieces of the rotor core member may assume an angular position within said stator core member at any point throughout the entire circumference of said stator core member irrespective of whether a central radial plane passing through the pole pieces is radially in line with a groove of said stator core member.

4. An instrument for transmitting angular movements, comprising a metal housing, a stator in said housing, including a hollow laminated cylindrical core member of magnetic material and having a plurality of circumferentially spaced grooves along its length on the inside thereof to form circumferentially spaced air gaps, a polyphase distributed winding in said grooves, a rotor journaled in said housing within said stator in inductive relation therewith and including a metal shaft the ends of which project through the respective ends of the housing, a contact pin carried by one end of the shaft coaxially therewith but insulated therefrom and projecting out of the housing, a contact arm carried by said housing exteriorly thereof but insulated therefrom and extending radially toward the shaft to engage the pin on the shaft, a second contact pin carried by the housing at its other end and having direct contact with said housing and extending radially toward and bearing against the shaft at its other end, a laminated core on said shaft intermediate its ends and forming a pair of oppositely disposed salient pole pieces, a lumped single-phase exciting winding on said core and having one end connected to the pin carried by the shaft and its other end connected to the shaft whereby the latter end is grounded to the housing, means for connecting a source of alternating current to said housing and to the contact arm insulatingly carried by said housing whereby a circuit is completed from the source to the rotor winding through the housing, and a cylindrical shell of magnetic material disposed within the stator core member and secured thereto for closing the circumferentially spaced air gaps of said stator to smooth out the magnetic path and evenly distribute the magnetic flux between the rotor and stator core members throughout the entire circumference of the stator core member whereby the pole pieces of the rotor core member may assume an angular position within the stator core member at any point throughout the entire circumference of said stator irrespective of whether said pole pieces are radially in line with a groove of said stator core member.

5. An instrument for transmitting angular movements, comprising a metal housing, a stator in said housing and having a polyphase winding, a rotor in inductive relation with said stator and having a single-phase winding, a metal shaft for said rotor and having its ends projecting through the respective ends of the housing, a contact pin in one end of said shaft coaxial therewith but insulated therefrom and projecting out of said housing, a contact arm carried by said housing exteriorly thereof but insulated therefrom and extending radially toward the shaft to engage the pin thereon, and a second pin carried by the housing at its other end and having direct electrical contact therewith and bearing against the other end of the shaft, said single-phase rotor winding having one end thereof connected to the shaft and its other end to the pin carried by the shaft.

6. An instrument for transmitting angular movements, comprising a two-part cylindrical metal housing constituted by a pair of cup-shaped members having peripheral flanges at their open ends, means for securing said members together at their flanges, said members also having annular recesses formed inside thereof extending longitudinally from the open ends partially into the interior, a boss formed on the rear wall of each of said cup-shaped members and projecting toward each other when said members are secured together, each boss having a concentric annular recess and a shaft-receiving opening, a stator in said housing and constituted by a hollow laminated cylindrical core having a plurality of longitudinal grooves on the inside thereof forming circumferentially spaced air gaps, and a polyphase distributed winding in said grooves, said cylindrical core being of substantially the same external diameter as the recesses at the open ends of the cup-shaped members so that the ends of said core fit therein whereby said core is securely held by said cup-shaped members therebetween, a rotor in inductive relation with said stator and including a shaft having a pair of ball bearings thereon with their inner races carried thereby, said bearings being so spaced apart on said shaft that the outer races thereof fit into the recesses formed in the bosses of said cup-shaped members and the ends of the shaft extend respectively into the concentric openings of the cup-shaped members, a laminated core on said shaft disposed between the ball bearings and providing a pair of oppositely disposed salient pole pieces cooperating with the interior of the cylindrical core of the stator, a single-phase winding wound on said rotor core about the pole pieces, a contact pin in one end of said rotor shaft coaxial therewith but insulated therefrom and projecting out of the housing, an insulating plate carried by the housing at the end at which said pin projects therefrom, three terminals carried by said plate for connecting the three phases of the stator winding to a corresponding winding of another instrument, a fourth terminal carried by said plate for connecting one end of the rotor winding to one terminal of an alternating current source, a contact arm connected to the latter terminal and extending radially toward the rotor shaft to engage the end of the pin carried by the shaft, said pin being connected to one end of the rotor winding whereby said end is connected to the source through said pin, a fifth terminal on said plate but extending therethrough and into the end wall of the housing to form a ground connection to which the other terminal of the source is to be connected, a second contact pin carried by the housing at the other end, said second pin being in electrical contact with the housing and extending radially toward and into electrical contact with the shaft at its other end, the other end of the rotor winding being connected to the shaft whereby said end is grounded through the second pin and the circuit of said winding is completed through the housing to the grounded terminal carried by the insulating plate, and a spring urging said second pin into engagement with said rotor shaft.

7. An instrument for transmitting angular movements, comprising a two-part cylindrical metal housing constituted by a pair of cup-shaped members having peripheral flanges at their open ends, means for securing said members together at their flanges, said members also having annular recesses formed inside thereof extending longitudinally from the open ends partially into the interior, a boss formed on the rear wall of each of said cup-shaped members and projecting toward each other when said members are secured together, each boss having a concentric annular recess and a shaft-receiving opening, a stator in said housing and constituted by a hollow laminated cylindrical core having a plurality of longitudinal grooves on the inside thereof forming circumferentially spaced air gaps, and a polyphase distributed winding in said grooves, said cylindrical core being of substantially the same external diameter as the recesses at the open ends of the cup-shaped members so that the ends of said core fit therein whereby said core is securely held by said cup-shaped members therebetween, a rotor in inductive relation with said stator and including a shaft having a pair of ball bearings thereon with their inner races carried thereby, said bearings being so spaced apart on said shaft that the outer races thereof fit into the recesses formed in the bosses of said cup-shaped members and the ends of the shaft extend respectively into the concentric openings of the cup-shaped members, a laminated core on said shaft disposed between the ball bearings and providing a pair of oppositely disposed salient pole pieces cooperating with the interior of the cylindrical core of the stator, a single-phase winding wound on said rotor core about the pole pieces, a contact pin in one end of said rotor shaft coaxial therewith but insulated therefrom and projecting out of the housing, an insulating plate carried by the housing at the end at which said pin projects therefrom, three terminals carried by said plate for connecting the three phases of the stator winding to a corresponding winding of another instrument, a fourth terminal carried by said plate for connecting one end of the rotor winding to one terminal of an alternating current source, a contact arm connected to the latter terminal and extending radially toward the rotor shaft to engage the end of the pin carried by the shaft, said pin being connected to one end of the rotor winding whereby said end is connected to the source through said pin, a fifth terminal on said plate but extending therethrough and into the end wall of the housing to form a ground connection to which the other terminal of the source is to be connected, a second contact pin carried by the housing at the other end, said second pin being in electrical contact with the housing and extending radially toward and into electrical contact with the shaft at its other end, the other end of the rotor winding being connected to the shaft whereby said end is grounded through the second pin and the circuit of said winding is completed through the housing to the grounded terminal carried by the insulating plate, a spring urging said second pin into engagement with said rotor shaft, and a cylindrical shell of magnetic material disposed within said stator core and secured thereto for closing the circumferentially spaced air gaps of said stator core to smooth out the magnetic path and evenly distribute the flux between the stator and rotor cores throughout the entire circumference of the stator core whereby the pole pieces of the rotor may assume an angular position within the stator at any point throughout the entire circumference of the stator core irrespective of whether a central radial plane passing through said pole pieces is radially in line with an air gap of said stator core.

8. An instrument for transmitting angular movements, comprising a stator member and a rotor member in inductive relation therewith, one of said members having a three-phase distributed winding wound on a cylindrical core having a plurality of circumferentially spaced longitudinal grooves forming circumferentially spaced air gaps, and the other of said members having a single-phase lumped winding wound on a core having two salient pole pieces cooperating with the cylindrical core of the other member whereby magnetic flux passes from one member to the other at the pole pieces, and a hollow cylindrical shell secured to the cylindrical core of the member having the distributed winding and concentrically therewith for closing the circumferentially spaced air gaps to smooth out the magnetic path and evenly distribute the flux between the rotor and stator members throughout the entire circumferential space between said members whereby the rotor member may assume an angular position with respect to the stator member at any point throughout one complete revolution of the rotor irrespective of whether the relative positions of the members at that point is such that the center of a pole piece of one member is opposite an air gap on the other member.

WLADIMIR A. REICHEL.
MORRIS F. KETAY.